United States Patent

Chun

Patent Number: 5,528,968
Date of Patent: Jun. 25, 1996

[54] PUNCH PRESS WITH AUTOMATED SHEET ROTATION

[75] Inventor: Victor L. Chun, Charlotte, N.C.

[73] Assignee: Murata Machinery, Ltd., Kyoto, Japan

[21] Appl. No.: 227,547

[22] Filed: Apr. 14, 1994

[51] Int. Cl.[6] ................................................. B26F 1/04
[52] U.S. Cl. ............................ 83/453; 83/461; 83/552
[58] Field of Search ............................ 83/552, 457, 458, 83/733, 410.7, 411.7, 563, 564, 461, 453; 29/40, 335, 66; 72/442; 483/28, 29

[56] References Cited

U.S. PATENT DOCUMENTS

| | | | |
|---|---|---|---|
| 3,706,249 | 12/1972 | Bruckner | 83/411.7 |
| 3,991,642 | 11/1976 | Kobayashi et al. | 83/552 |
| 4,162,641 | 7/1979 | Stubbings | 83/552 |
| 4,285,259 | 8/1981 | Jelinek et al. | 83/552 |
| 5,044,239 | 9/1991 | Endo et al. | 83/552 |
| 5,259,100 | 11/1993 | Takahashi | 29/40 |
| 5,367,935 | 11/1994 | Matsuda | 83/552 |

FOREIGN PATENT DOCUMENTS 0560333  9/1993  European Pat. Off. ............... 83/552

*Primary Examiner*—Rinaldi I. Rada
*Assistant Examiner*—Allan M. Schrock
*Attorney, Agent, or Firm*—John R. Benefiel

[57] ABSTRACT

An automated workpiece rotation is accomplished by clamping the workpiece, to the lower turret of a turret punch press in the press carriage grippers and rotating the turret 180° to reorient an oversized workpiece in order to enable completion of a punching program on the workpiece. The turret is positively located in each rotated position, and the degree of tilt of the rotated sheet in the press carriage grippers is determined by edge detectors.

7 Claims, 5 Drawing Sheets

PUNCH PRESS WITH AUTOMATED SHEET ROTATION

BACKGROUND OF THE INVENTION

1. Field of the Invention

This invention concerns punch presses and more particularly workpiece handling for punch presses.

2. Description of the State of the Art

Punch presses are conventionally configured with a C-shaped frame with the press ram located at the forward end of the upper C-frame member. Sheet material workpieces are movable within the throat opening in order to position the workpiece at the proper locations whereat punching is to be conducted.

Punch presses are typically automated, having a carriage with two or more gripper mechanisms gripping one edge of the sheet workpiece and traversing the same under a program control along orthogonal directions in a horizontal plane to various positions, bringing various locations on the workpiece to the punching station beneath the press ram. In many presses, the carriage-gripper assembly is located outside the throat opening holding the workpiece which extends back into the opening, other presses use so-called "rear address" carriages, in which the gripper-carriage assembly is disposed within the throat opening and the workpiece extends outwardly. In the rear address type of press, larger sheet sizes can be accommodated since the free end of a workpiece can project far out of the press throat area. However, the workpiece areas positionable at the punching station are limited since the carriage-gripper assembly outward travel is limited by the press throat depth.

Accordingly, it has heretofore been the practice to manually rotate the workpiece to reposition the far edge within the press throat opening, and a second phase of programmed punching then conducted in order to complete the punching on the rest of the workpiece. The need for manual intervention in the process slows the production rate and increases the production costs due to the extra labor required.

Punch presses are often equipped with tool holding upper and lower turrets to enable the various different punch-die tool sets to be selectively driven to the punching station.

Such tool sets have included indexing type drives which have the capability of rotating the tool in the station so as to allow orientations of the punching tool to be set.

It has heretofore been proposed that an indexing station be utilized to accomplish powered rotation of a workpiece to eliminate the need for manual handling. In this arrangement, the force of the press ram is used to press a worksheet engaging pad into frictional engagement with the workpiece and a rotary drive for the indexing station activated to accomplish rotation of the workpiece.

This approach has several disadvantages, however.

Firstly, the use of the indexing station dedicated to workpiece rotation for punch tooling is precluded, reducing the tooling selection available inasmuch as the particular indexing station so utilized obviously cannot also be used to accommodate tooling.

Secondly, this approach requires that hydraulic ram actuation be used, since the ram actuator must be capable of advancing the ram through a partial stroke and applying a predetermined pressure to the workpiece. Thus, conventional presses using mechanical ram drives cannot be adapted to the concept.

Finally, the accuracy of angular positioning of the workpiece achievable with such indexing drives is not great, thus making reliable processing difficult to achieve.

Accordingly, it is an object of the present invention to provide automated workpiece rotation in a punch press which is adapted to punch presses having mechanical, hydraulic, or other actuation means for the ram.

It is another object of the present invention to provide an automatic workpiece rotation which does not reduce the tooling capacity of the rotary turrets.

It is still another object of the present invention to provide an automated sheet rotation mechanism for rotary turret punch presses in which a high degree of positioning accuracy of the workpiece is easily achievable.

SUMMARY OF THE INVENTION

These and other objects of the present invention which will become apparent upon a reading of the following specification and claims are achieved by clamping the workpiece to one of the turrets, preferably the lower turret, and rotating the workpiece by operation of the turret servo drive. This is accomplished with a clamping plunger slidably mounted in the hub of one of the turrets (preferably the upper turret), aligned with its axis of rotation. Actuation means are provided for axially advancing the clamping plunger against an anvil surface located on the opposite turret (i.e., the lower turret), so as to enable a workpiece to be clamped against the anvil surface.

A fluid pressure actuation and spring return is provided by a connected piston slidable in a bore in the turret hub.

The rotary servo drive of the turret carrying the anvil surface is then operated to rotate the workpiece to a new orientation, typically to a 180° rotated position. Mating locating bushings and pins are provided at each rotated position of the turret to provide precise location of the turret in the respective rotated positions.

The gripper mechanisms of the workpiece handling carriage are provided with workpiece edge sensors which detect the presence of the workpiece in the respective gripper mechanisms.

The workpiece edge sensors preferably provide variable signals corresponding to the position of the workpiece edge, which signals are electronically compared to each other to determine the squareness of the workpiece relative the carriage. Thus, when a tilted position beyond a predetermined tolerance is detected, a fault condition may be triggered.

DETAILED DESCRIPTION

In the following detailed description certain specific terminology will be employed for the sake of clarity and a particular embodiment described in accordance with the requirements of 35 USC 112, but it is to be understood that the same is not intended to be limiting and indeed should not be so construed inasmuch as the invention is capable of taking many forms and variations within the scope of the appended claims.

Figure 1:
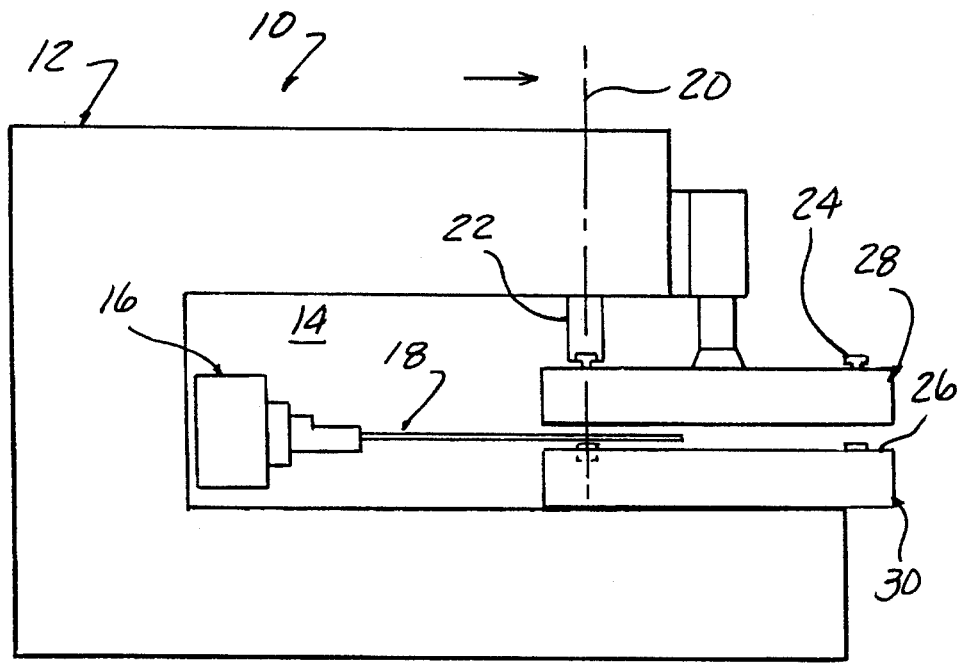
FIG. 1 is a side elevational view of a rear address punch press showing an oversized workpiece held in the carriage gripper assembly.

Referring to the drawings, a punch press 10 of a rear address configuration is shown in FIG. 1. This includes a punch press C-frame 12 of the traditional configuration, in which a throat opening 14 is defined which receives a carriage-gripper assembly 16 within the throat opening 14 able to be moved outwardly so as to programmably position a workpiece 18 in selected locations in a horizontal plane.

Various portions thereof are thereby aligned beneath a punching station centerline 20 defined by the location of the press ram 22.

Punching operations are conducted by the ram 22 driving any of various punches 24 into mating dies 26 carried by an upper turret 28 and lower turret 30 respectively.

The upper turrets and lower turrets 28, 30 are rotated under program control by suitable servo rotary drive mechanisms (not shown) to bring a selected punch and die set to the punching station 20 to conduct a particular punching or forming operation on the workpiece 18.

Figure 2:
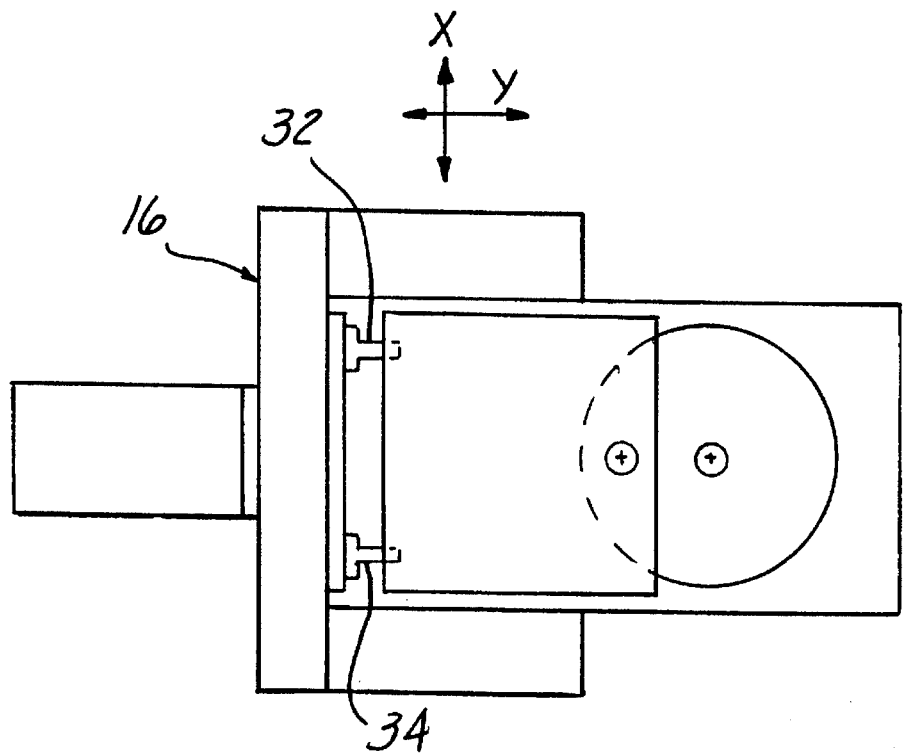
FIG. 2 is a plan diagrammatic view of the punch press shown in FIG. 1 showing the carriage-gripper assembly in the fully retracted position.
Figure 3:
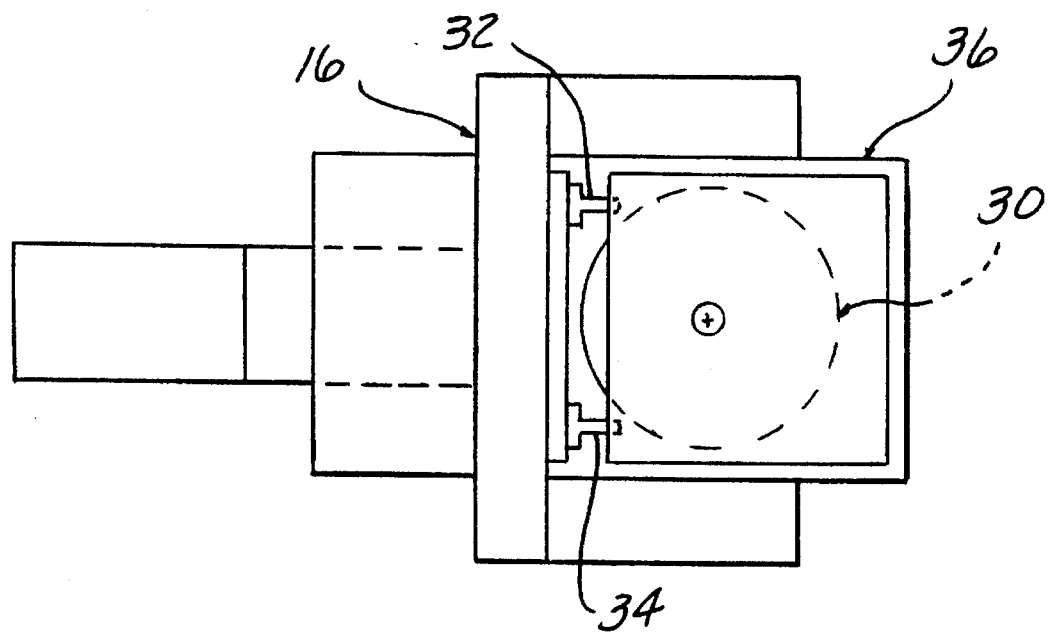
FIG. 3 is a plan view of the punch press as shown in FIG. 2 with the carriage advanced to an extended position prior to an automatic sheet rotation by the arrangement according to the present invention.

The workpiece 18 shown is oversized along the Y-axis. That is, in a fully retracted position of a carriage-gripper assembly 16, the far portion of the workpiece 18 cannot be brought beneath the press ram 22 at the punching station 20 as also seen in FIG. 2.

Accordingly, if punching or forming operations are required on that portion of the workpiece, the workpiece must be rotated 180° such that the grippers 32, 34 of the carriage-gripper assembly 16 may be engaged with the opposite edge 18A.

Figure 4:
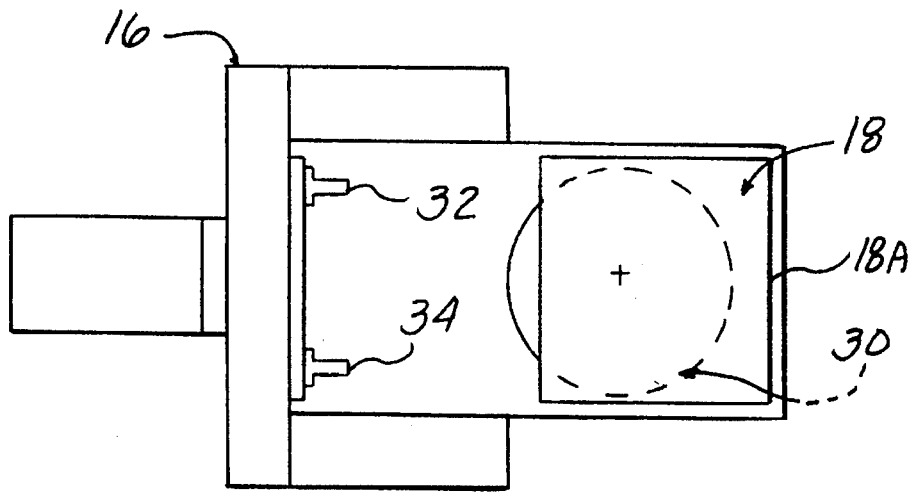
FIG. 4 is a plan view of the punch press and workpiece showing the workpiece released and the carriage mechanism retracted in preparation for workpiece rotation.

This is accomplished by advancing the carriage-gripper assembly 16 out towards the end of the press stationary table 36. The center of the workpiece 18 is thereby located beyond the center axis of the turrets 28, 30. The grippers 32, 34 are released, and the carriage-gripper assembly 16 is retracted to its fully retracted position as shown in FIG. 4, leaving the workpiece at its outward location.

Figure 5:
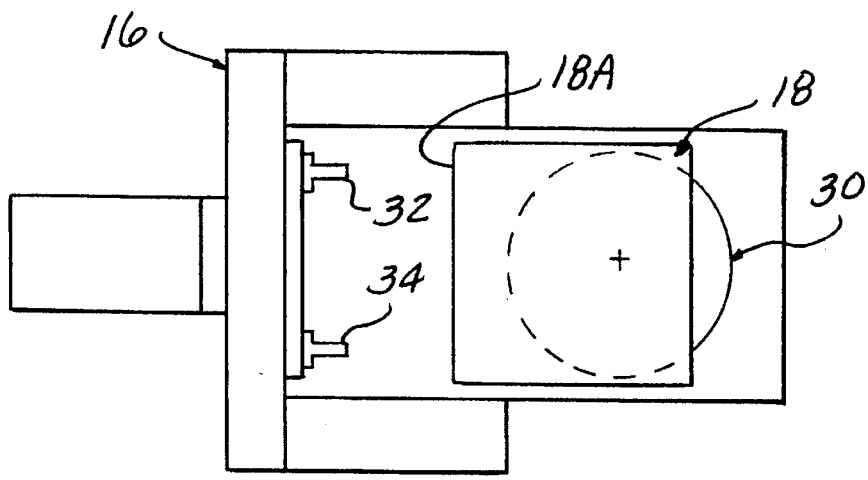
FIG. 5 is a plan view of the punch press showing completion of the 180° workpiece rotation.
Figure 6:
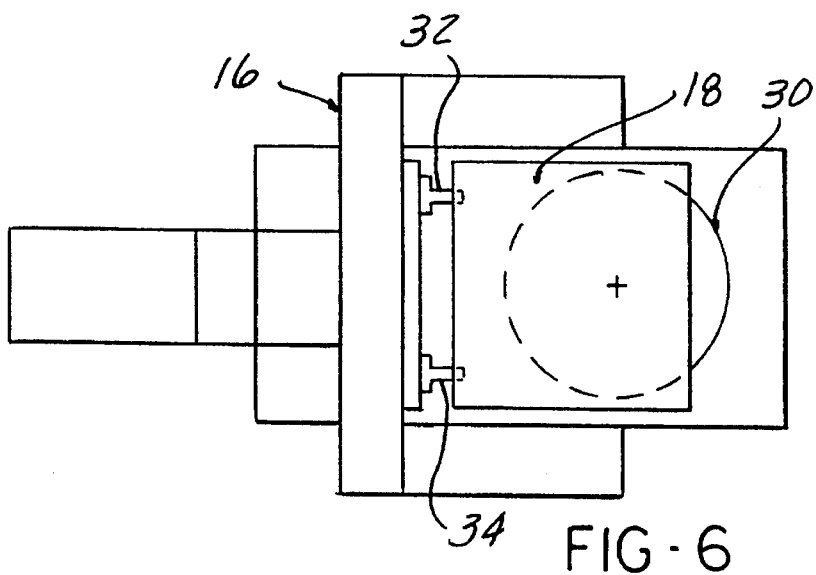
FIG. 6 is a plan view showing the carriage advanced to bring the gripper mechanisms into engagement with the opposite edge of the workpiece after the 180° rotation.

The workpiece 18 is then rotated 180°, bringing the edge 18A previously remote from the grippers 32, 34 to be on the side adjacent the grippers 32, 34 as seen in FIG. 5.

Figure 7:
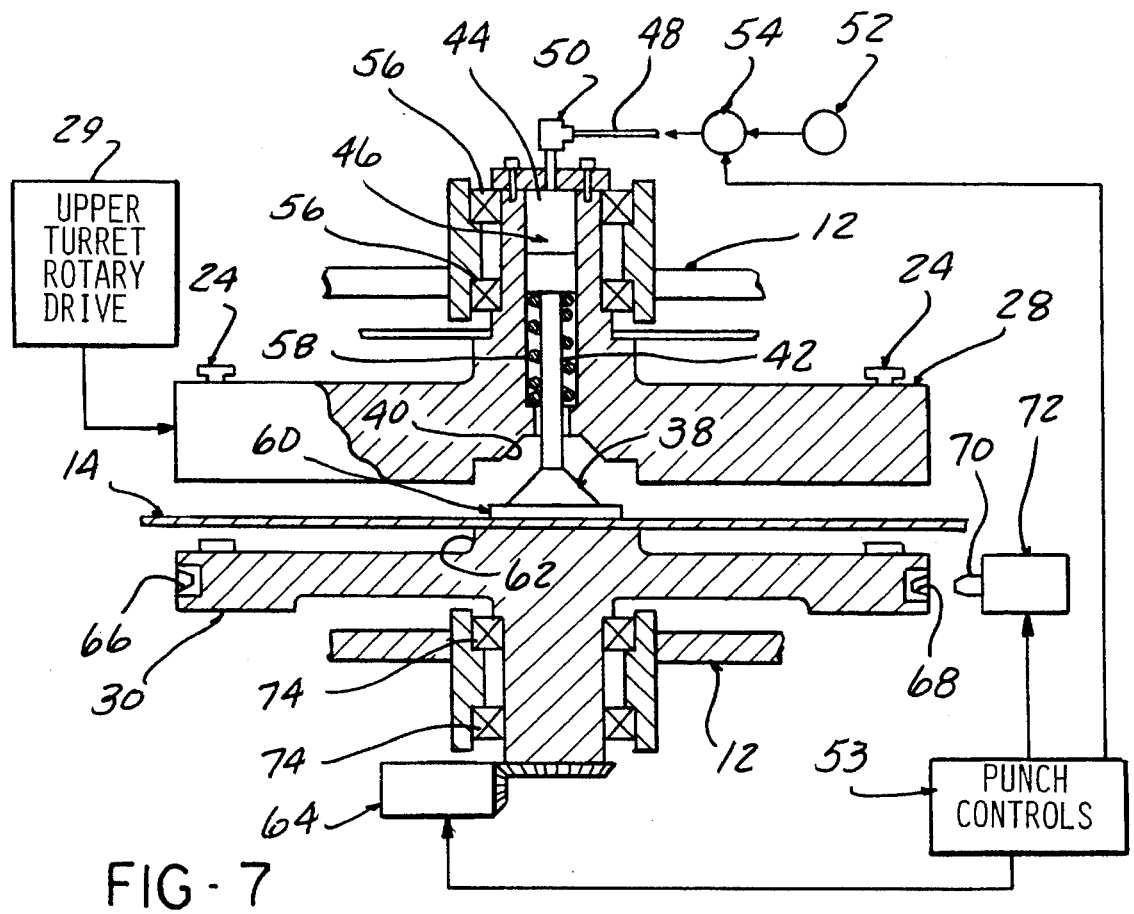
FIG. 7 is a fragmentary sectional view taken through the upper and lower turrets showing a workpiece being clamped by means of the clamping plunger incorporated in the workpiece rotation arrangement according to the present invention.

FIG. 7 illustrates the arrangement according to the present invention for rotating the piece 18. The upper turret 28 slidably receives a clamping plunger 38 adapted to be normally recessed within a complementarily shaped counterbore 40.

Actuation means for forcibly advancing the plunger clamp 38 axially is provided by a stem portion 42 extending into a sealed bore 44 defined in a hub of the upper turret 28. The stem has a piston 46 attached or integral therewith which is slidable within the bore 44. The portion of the bore 44 above the upper face of the piston 46 is able to be selectively pressurized via an air line 48 and rotary fittings 50 from an air pressure source 52 and a control valve 54 operated by the punch press controls 53.

The upper turret 28 is rotatable in bearings 56 by a servo mechanism (not shown in FIG. 7) in order to carry the punch tooling 24 to the punching station 20 as discussed above.

A return spring 58 engages the piston 46 such as to urge the clamping plunger 38 to its retracted raised position, pressurization of the bore 44 driving the clamping plunger 38 axially downwardly against the force of the spring 58.

The clamping plunger 38 has an enlarged head portion 60 defining an end face which acts to force the workpiece 18 against an enlarged hub 62 on the lower turret 30 acting as defining an anvil surface. Thus a relatively large area clamping surface engagement results such as to render the workpiece 14 rotatively fixed with respect to the lower turret 30. The lower turret 30 is then rotated by its servo mechanism indicated diagrammatically at 64 to undergo a predetermined extent of rotation, i.e., 180° described above.

The lower turret is preferably located in each rotated position by means of a locating mechanism comprised of tapered bushings 66, 68 which are engaged by a shot pin 70 driven by an actuator 72 in each rotated position such as to provide a precise location of the lower turret 30 in each rotated position. This provides accurate positioning of the workpiece 18 in these respective rotated positions.

The lower turret 30 is rotated in bearing 74 supported in the press frame 12.

Accordingly, the clamping pressure is exerted by an independent actuation means unrelated to the press ram 22. Similarly, there is no loss of availability of any punch tooling locations in the upper and lower turrets 28, 30.

Figure 8:
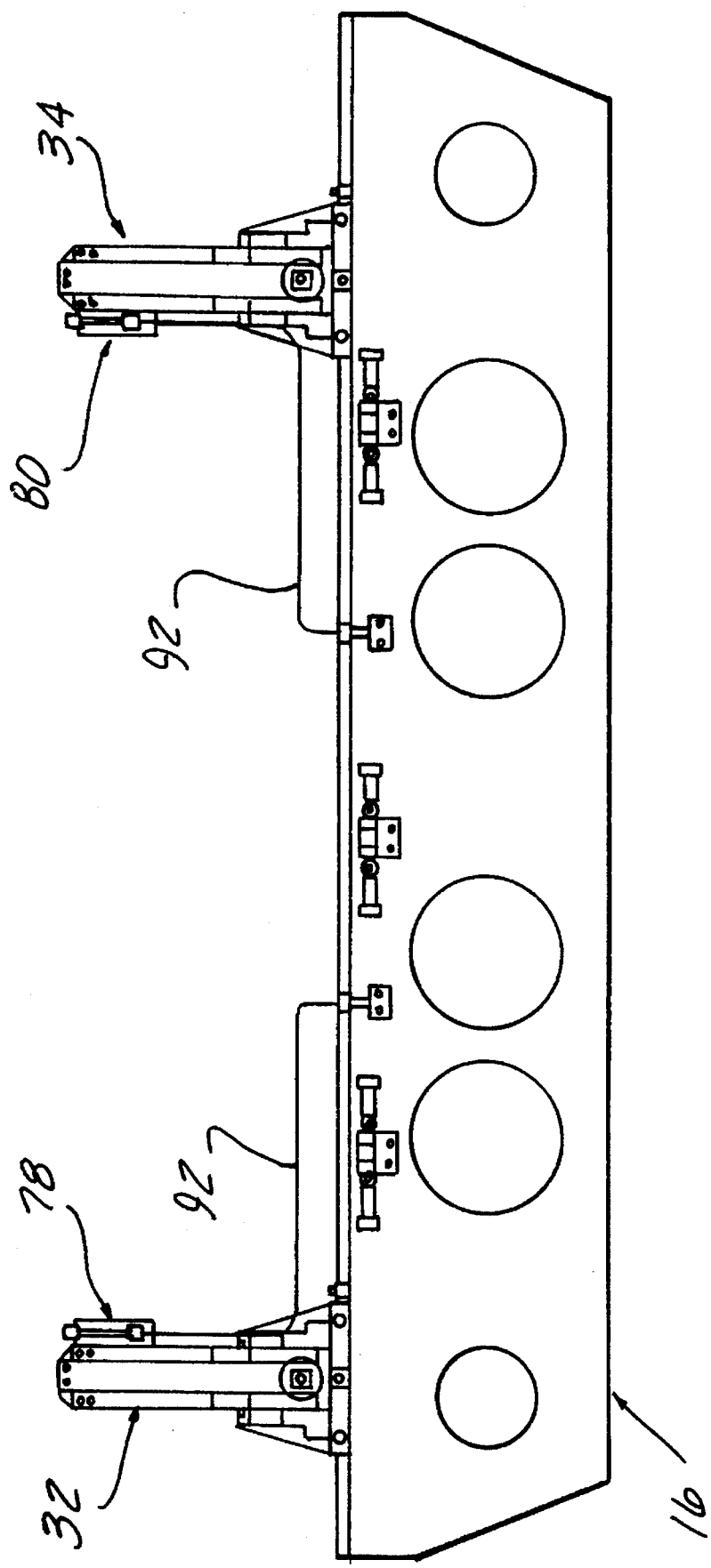
FIG. 8 is a fragmentary plan view of a carriage-gripper assembly showing the workpiece edge sensors.

FIG. 8 shows a fragmentary portion of the carriage-gripper assembly 16 in which the gripper mechanisms 32, 34 each have workpiece edge sensors 78 and 80 associated therewith.

Figure 9:
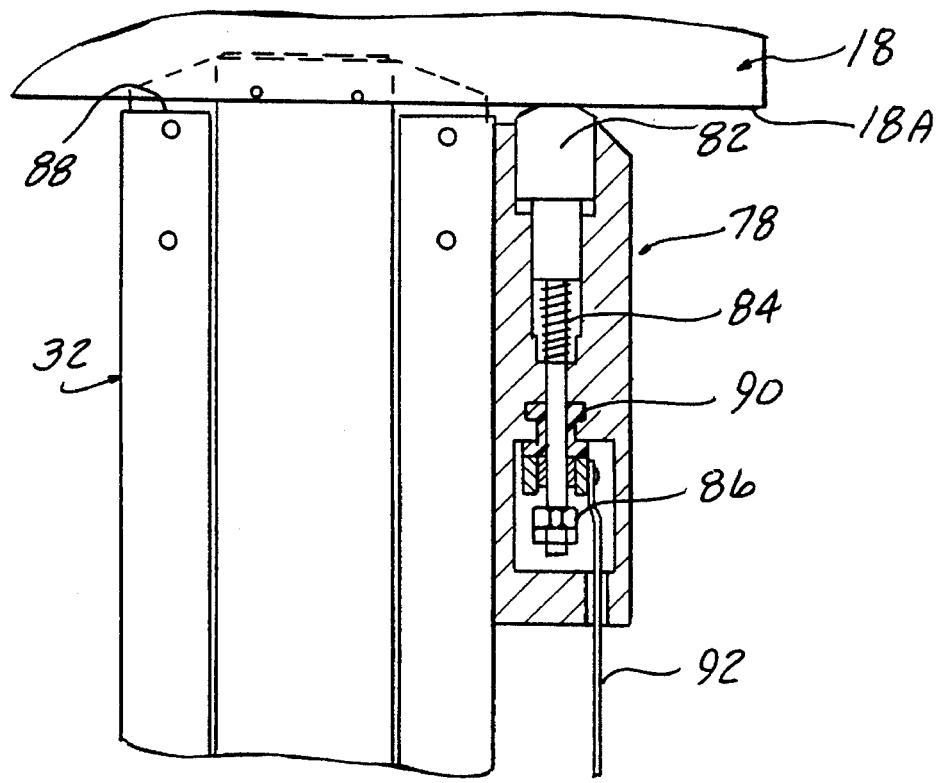
FIG. 9 is a fragmentary enlarged plan view of the leading portion of one of the gripper mechanisms and a partially sectional view of the workpiece edge sensing arrangement.

The edge sensor 78 shown in detail in FIG. 9 includes a movable sensor tip 82 slidable against a force of a spring 84, adjusting jam nuts 86 limiting the outward extension of the element 82.

A locating surface 88 extends across the outer face of the gripper mechanism 32 which is located behind the outermost extended position 82. The edge 18A of the workpiece 18 first engages the outer face of the element 82, and thence is moved inward against abutment to be in the locating face 88.

A brass contact sleeve 90 allows making and breaking of electrical continuity to be sensed via a wire lead 92. Accordingly, the presence of a workpiece edge 18A can be detected and processing not allowed to proceed unless the presence of a workpiece 18 is verified.

Figure 10:
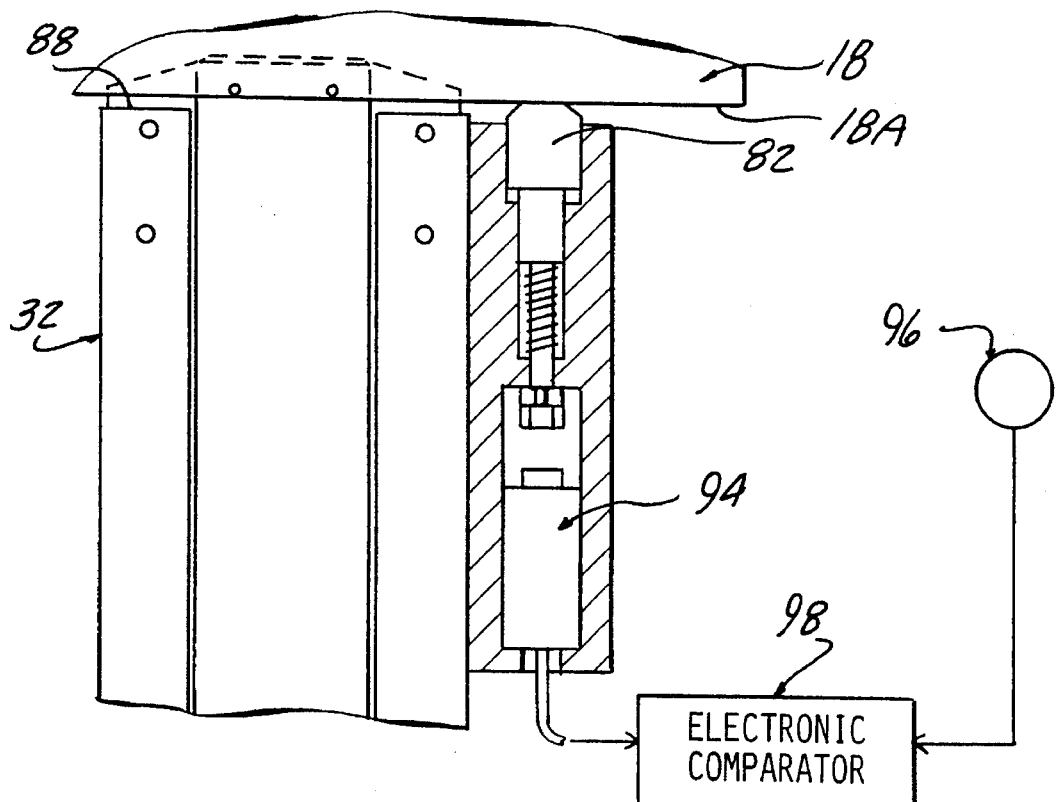
FIG. 10 is an enlarged fragmentary plan view of the gripper mechanism showing an alternate form of the workpiece edge sensor.

While such sensors are known in conventional punch presses, FIG. 10 illustrates a refinement having particular preferred application to the workpiece rotation arrangement according to the present invention. In this case, a proximity sensor 94 (or LVDT detector) is provided which generates a varying signal corresponding to the displacement of the element 82 as the workpiece edge 18A moves towards the locating edge 88. As each side of the workpiece 18 engages the respective clamping mechanism 32, 34, electrical signals are generated by detectors 94, 96 which correspond to the difference in the positions of the edge 18A in the respective gripper mechanisms 32, 34.

Accordingly, by electronically comparing signals from detectors 94, 96 in comparator circuit 98, the degree of tilt of the workpiece 18 can be computed, and if beyond a certain predetermined tolerable level, a fault condition indicated requiring correction prior to execution of the punching program.

Accordingly, it can be appreciated that the above recited objects are achieved by the arrangement described in which the existing servo mechanism of a turret is employed to carry out the workpiece rotation.

The clamping is executed independently of the press ram and further no use of any of the turret tooling pockets is required, which maintains full tool selection capability.

The servo drive of the turrets and the locating mechanism insures precise positioning in each rotated position.

I claim:

1. A punch press comprising:

a punch press C-frame defining a throat opening;

a press ram located at a punching station;

a carriage mechanism mounted within said throat opening for movement in a horizontal plane to move a workpiece gripped in gripper mechanisms mounted on said carriage mechanism to bring selected areas of said workpiece to said punching station, said carriage mechanism movable to a retracted position in said throat opening remote from said punching station;

an upper and a lower turret mounted for rotation about aligned vertical axes, said upper and lower turrets respectively carrying punch and die tooling in a peripheral array of pockets formed therein;

rotary drive means for rotating each of said turrets to bring selected punch and die tooling on said turrets to said punching station;

a clamping plunger rotatably mounted on one of said turrets, said plunger being aligned with said axes of rotation of said turrets to be axially displaceable from a retracted to an extended position shifted towards the the other turret;

an anvil surface on said other turret facing a clamping face on a head portion of said clamping plunger;

an actuator for causing forcible extension of said clamping plunger to an extended position whereat a workpiece is clamped between said anvil surface and said clamping plunger face; and control means causing said rotary drive means to operate to cause a predetermined extent of rotation of said other turret with said clamping plunger engaged with said workpiece to rotate and reorient said workpiece in said punch press after release of said gripper mechanisms and movement of said carriage mechanism to said retracted position, whereby punching operations can be conducted on any area of an oversized workpiece, which workpiece is of sufficient size so that said carriage mechanism cannot bring all areas into alignment with said punching station.

2. The punch press according to claim 1 further including a locator mechanism having a locator element moved to engage said other turret in each of said rotated positions to exactly locate said other turret and said rotated workpiece sheet in each rotated position.

3. The punch press according to claim 1 wherein only said lower turret is rotated by said rotary drive means when said plunger engages said workpiece.

4. The punch press according to claim 3 wherein said clamping plunger is mounted to said upper turret.

5. The punch press according to claim 4 wherein said upper turret has a recess formed therein receiving said head portion of said clamping plunger with said clamping plunger in said retracted position.

6. The punch press according to claim 5 wherein said clamping plunger has a portion which extends into a sealed bore in said upper turret, a piston carried by said portion and slidable in said bore, and said actuator further including means for pressurizing said bore to cause advance of said piston and said extending movement of said clamping plunger.

7. The punch press according to claim 1 further including a workpiece edge detector carried by each of said gripper mechanisms, each edge detector generating a signal corresponding to the relative position of said workpiece edge in a respective gripper mechanism, and electronic comparator means receiving the signals from each edge detector to generate an indication of the degree of tilt of said workpiece relative said carriage.

\* \* \* \* \*